(12) United States Patent
Khan et al.

(10) Patent No.: US 8,989,285 B2
(45) Date of Patent: Mar. 24, 2015

(54) EFFICIENT MIMO PRECODING FEEDBACK SCHEME

(75) Inventors: Farooq Khan, Allen, TX (US); Zhouyue Pi, Richardson, TX (US); Cornelius Van Rensburg, Dallas, TX (US); Jianzhong Zhang, Irving, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1400 days.

(21) Appl. No.: 12/216,422

(22) Filed: Jul. 3, 2008

(65) Prior Publication Data

US 2009/0080549 A1    Mar. 26, 2009

Related U.S. Application Data

(60) Provisional application No. 60/960,372, filed on Sep. 26, 2007.

(51) Int. Cl.
*H04K 1/10* (2006.01)
*H04L 27/28* (2006.01)
*H04L 25/03* (2006.01)
*H04B 7/04* (2006.01)
*H04L 5/00* (2006.01)
*H04L 25/02* (2006.01)

(52) U.S. Cl.
CPC ........ *H04L 25/03343* (2013.01); *H04B 7/0417* (2013.01); *H04L 5/0007* (2013.01); *H04L 5/0053* (2013.01); *H04L 5/006* (2013.01); *H04L 25/0204* (2013.01); *H04L 25/0228* (2013.01); *H04L 2025/03414* (2013.01); *H04L 2025/03426* (2013.01); *H04B 7/0478* (2013.01)

USPC .......... 375/260; 375/346; 375/349; 375/219; 375/220; 455/563; 455/67.11

(58) Field of Classification Search
CPC .............. H04L 27/2647; H04L 5/0007; H04L 27/2657; H04L 27/2662; H04L 5/0048; H04L 1/20; H04L 1/06; H04L 25/0204; H04L 1/0026; H04B 1/1027; H04B 1/123; H04B 7/002; H04B 1/109; H04B 17/0042; H04B 17/0057; H04M 1/271; H04M 1/72519; H04M 1/6041; H04M 2250/74; H04W 24/00; H04W 24/08

USPC .......... 375/260, 346, 349, 219, 220; 455/563, 455/67.11

See application file for complete search history.

(56) References Cited

U.S. PATENT DOCUMENTS 7,839,835 B2 * 11/2010 Khojastepour et al. ........ 370/343
2007/0265037 A1 * 11/2007 Pan et al. ...................... 455/563
2008/0305745 A1 * 12/2008 Zhang et al. ................ 455/67.11

* cited by examiner

*Primary Examiner* — Phuong Phu

(57) ABSTRACT

Methods and apparatus for efficiently feeding back precoding information in a multiple input multiple output (MIMO) system. A codebook including a plurality of codebook entries is constructed. A plurality of subsets of codebook entries are defined for the codebook. Each subset includes a plurality of codebook entries. A subset of codebook entries is selected for precoding data in dependence upon a channel condition, and a codebook entry is selected from the subset. Then, a subset index corresponding to the selected subset, and a codebook entry index corresponding to the selected codebook entry within the selected subset, is transmitted as feedback information.

36 Claims, 18 Drawing Sheets

| Subset-1 | Codebook index 0-3 |
| Subset-2 | Codebook index 4-7 |
| Subset-3 | Codebook index 8-11 |
| Subset-4 | Codebook index 12-15 |

FIG. 8

| Subset-1 | Codebook index 0-7 |
| Subset-2 | Codebook index 4-11 |
| Subset-3 | Codebook index 8-15 |
| Subset-4 | Codebook index 12-15,0,1,2,3 |

FIG. 10

| Subset-1 | Codebook index 0-1 |
| Subset-2 | Codebook index 2-3 |
| Subset-3 | Codebook index 4-5 |
| Subset-4 | Codebook index 6-7 |
| Subset-5 | Codebook index 8-9 |
| Subset-6 | Codebook index 10-11 |
| Subset-7 | Codebook index 12-13 |
| Subset-8 | Codebook index 14-15 |

FIG. 12

EFFICIENT MIMO PRECODING FEEDBACK SCHEME

CLAIM OF PRIORITY

This application makes reference to, incorporates the same herein, and claims all benefits accruing under 35 U.S.C. §119 from a provisional application earlier filed in the U.S. Patent & Trademark Office on 26 Sep. 2007 and there duly assigned Ser. No. 60/960,372.

BACKGROUND OF THE INVENTION

1. Field of the Invention

The present invention relates to methods and apparatus for efficiently feeding back precoding information in a multiple input multiple output (MIMO) system.

2. Description of the Related Art

Orthogonal Frequency Division Multiplexing (OFDM) is a popular wireless communication technology to multiplex data in frequency domain.

A multiple antenna communication system, which is often referred to as multiple input multiple output (MIMO) system, is widely used in combination with OFDM technology, in a wireless communication system to improve system performance.

When the transmission channels between the transmitters and the receivers are relatively constant, it is possible to use a closed-loop MIMO scheme to further improve system performance. In a closed-loop MIMO system, the receiver first transmits information regarding the channel condition to the transmitter. The transmitter utilizes this information, together with other considerations such as scheduling priority, data and resource availability, to select a preceding unit. In the transmitter, the data streams to be transmitted are precoded, i.e., pre-multiplied by the preceding matrix, before being passed on to the multiple transmit antennas.

In a contemporary closed-loop MIMO precoding scheme, when a transmitter precodes data before transmitting the data to a receiver, the transmitter informs the receiver of the precoding information such as precoding matrix index (PMI) and transmission rank.

The precoding matrix indication (PMI) and rank feedback on a subband basis can result in significant feedback overhead. For example, and assuming 4-bits per subband for PMI and 2-bits per subband for rank, the total overhead for feedback on five subbands is 30 bits. For larger system bandwidths, the system needs to support a larger number of subbands, thus resulting in even larger feedback overhead. Also, for finer granularity of PMI/rank feedback in frequency, the overhead also increases. Therefore, there is a need to improve the PMI and rank feedback mechanisms that reduces the overhead.

SUMMARY OF THE INVENTION

It is therefore an object of the present invention to provide a method and apparatus for efficiently feeding back precoding information.

According to one aspect of the present invention, a codebook including a plurality of codebook entries is constructed. A plurality of subsets of codebook entries are defined for the codebook. Each subset includes a plurality of codebook entries. A subset of codebook entries is selected for precoding data in dependence upon a channel condition, and a codebook entry is selected from the subset. Then, a subset index corresponding to the selected subset, and a codebook entry index corresponding to the selected codebook entry within the selected subset, is transmitted as feedback information.

At least two subsets may have no overlapping codebook entries.

Alternatively, at least two subsets may have at least one overlapping codebook entry.

A transmission resource block may be divided into a plurality of time units in time domain and a plurality of frequency units in frequency domain. Then, the selection of the codebook entry and the transmission of the codebook entry index may be performed for each frequency unit in the transmission resource block.

Moreover, a transmission rank may be selected and a transmission rank index corresponding to the selected transmission rank may be transmitted. The selection of the transmission rank and the transmission of the transmission rank index may be performed for each frequency unit in the transmission resource block.

Alternatively, the selection of the codebook entry and the transmission of the codebook entry index may be performed for each time unit in the transmission resource block.

Still alternatively, the selection of the codebook entry and the transmission of the codebook entry index may be performed for each frequency unit within each time unit in the transmission resource block.

According to another aspect of the present invention, a plurality of subsets may be defined for a codebook, and each subset includes a single codebook entry. A subset is selected for precoding data in dependence upon a channel condition. Then, a subset index corresponding to the selected subset is transmitted as feedback information.

According to still another aspect of the present invention, a plurality of subsets may be defined for a codebook, and each subset includes a plurality of codebook entries. A bitmap may be defined for each of the subset. The bitmap consists of at least one bit-"0" and at least one bit-"1". Each bit-"1" indicates a corresponding codebook entry in the subset. A subset of codebook entries is selected for precoding data in dependence upon a channel condition, and a codebook entry is selected from the subset. Then, a bitmap corresponding to the selected subset and a codebook entry index corresponding to the selected codebook entry within the selected subset is transmitted as the feedback information.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 8 schematically illustrates four subsets of a codebook as an embodiment according to the principles of the present invention;

FIG. 10 schematically illustrates four subsets of a codebook as another embodiment according to the principles of the present invention;

FIG. 12 schematically illustrates four subsets of a codebook as still another embodiment according to the principles of the present invention;

DETAILED DESCRIPTION OF THE INVENTION

Figure 1:
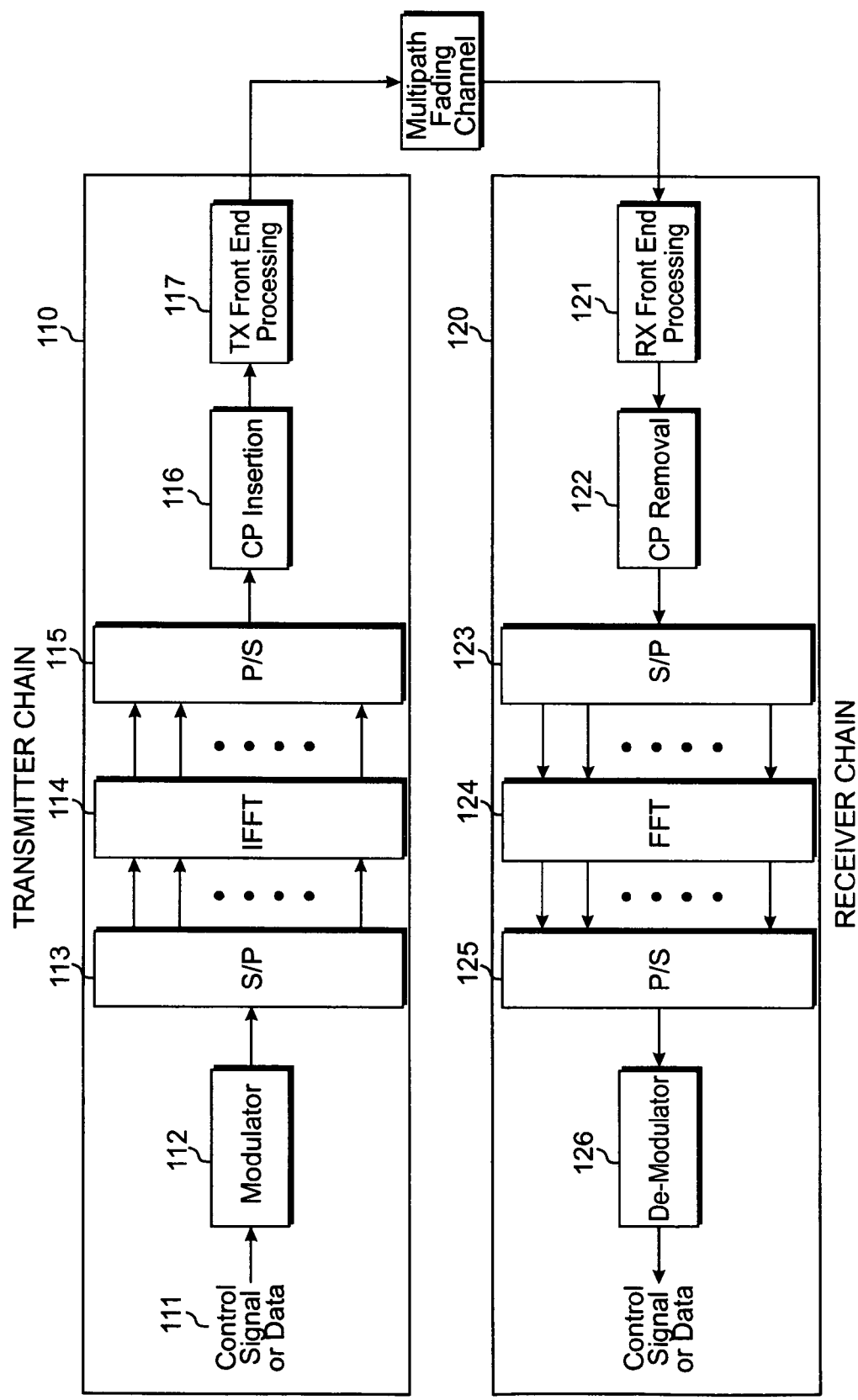
FIG. 1 schematically illustrates an Orthogonal Frequency Division Multiplexing (OFDM) transceiver chain.

FIG. 1 illustrates an Orthogonal Frequency Division Multiplexing (OFDM) transceiver chain. In a communication system using OFDM technology, at transmitter chain 110, control signals or data 111 is modulated by modulator 112 and is serial-to-parallel converted by Serial/Parallel (S/P) converter 113. Inverse Fast Fourier Transform (IFFT) unit 114 is used to transfer the signal from frequency domain to time domain. Cyclic prefix (CP) or zero prefix (ZP) is added to each OFDM symbol by CP insertion unit 116 to avoid or mitigate the impact due to multipath fading. Consequently, the signal is transmitted by transmitter (Tx) front end processing unit 117, such as an antenna (not shown), or alternatively, by fixed wire or cable. At receiver chain 120, assuming perfect time and frequency synchronization are achieved, the signal received by receiver (Rx) front end processing unit 121 is processed by CP removal unit 122. Fast Fourier Transform (FFT) unit 124 transfers the received signal from time domain to frequency domain for further processing.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

Figure 2:
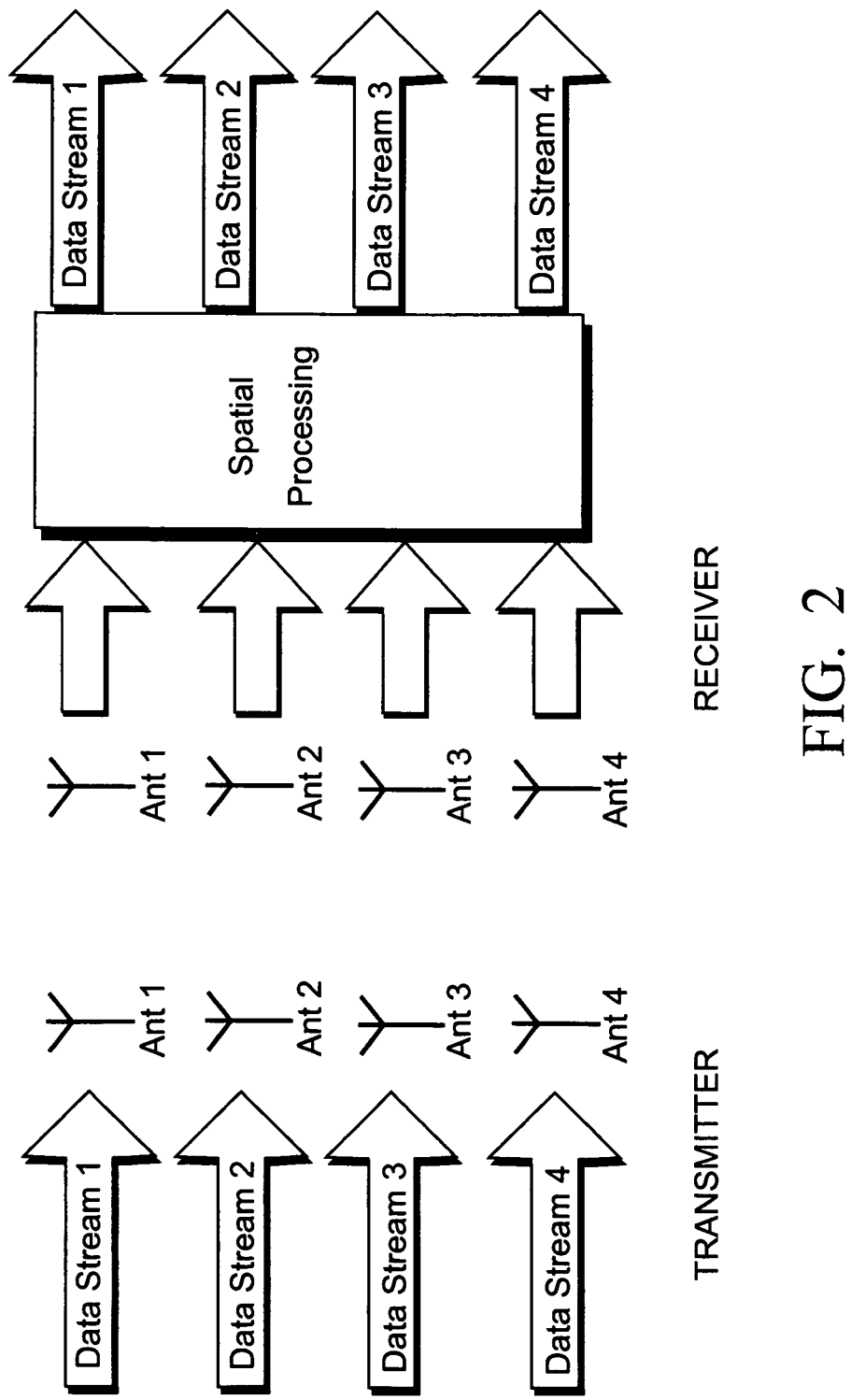
FIG. 2 schematically illustrates a Multiple Input Multiple Output (MIMO) transceiver chain.

Multiple Input Multiple Output (MIMO) schemes use multiple transmission antennas and multiple receive antennas to improve the capacity and reliability of a wireless communication channel. A MIMO system promises linear increase in capacity with K where K is the minimum of number of transmit (M) and receive antennas (N), i.e. K=min(M,N). A simplified example of a 4×4 MIMO system is shown in FIG. 2. In this example, four different data streams are transmitted separately from four transmission antennas. The transmitted signals are received at four receive antennas. Some form of spatial signal processing is performed on the received signals in order to recover the four data streams. An example of spatial signal processing is vertical Bell Laboratories Layered Space-Time (V-BLAST) which uses the successive interference cancellation principle to recover the transmitted data streams. Other variants of MIMO schemes include schemes that perform some kind of space-time coding across the transmission antennas (e.g., diagonal Bell Laboratories Layered Space-Time (D-BLAST)) and also beamforming schemes such as Spatial Division multiple Access (SDMA).

The MIMO channel estimation consists of estimating the channel gain and phase information for links from each of the transmission antennas to each of the receive antennas. Therefore, the channel for M×N MIMO system consists of an N×M matrix:

$$H = \begin{bmatrix} h_{11} & h_{12} & \cdots & h_{1M} \\ h_{21} & h_{22} & \cdots & h_{2M} \\ \vdots & \vdots & \cdots & \vdots \\ h_{N1} & h_{M2} & \cdots & h_{NM} \end{bmatrix} \quad (1)$$

where $h_{ij}$ represents the channel gain from transmission antenna j to receive antenna i. In order to enable the estimations of the elements of the MIMO channel matrix, separate pilots are transmitted from each of the transmission antennas.

Figure 3:
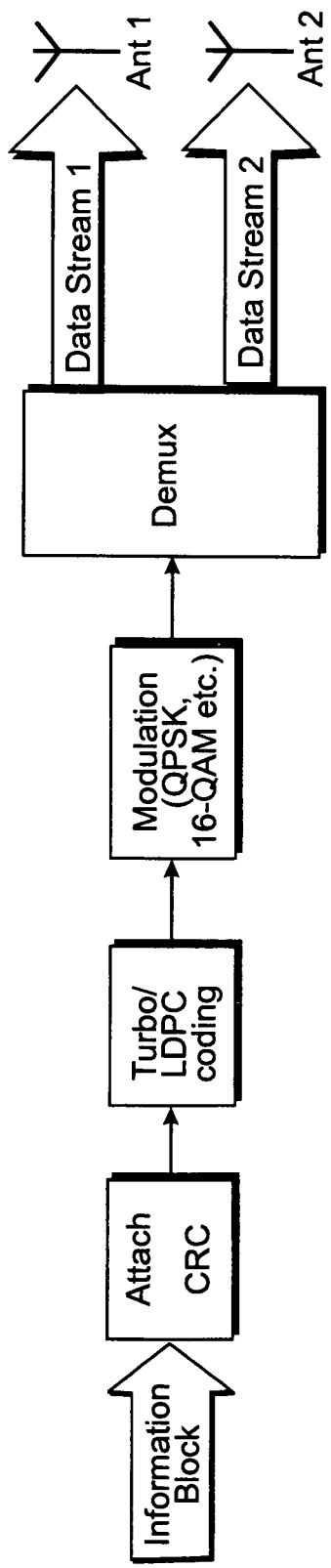
FIG. 3 schematically illustrates a single codeword MIMO transmission scheme.

An example of single-code word MIMO scheme is given in FIG. 3. In case of single-code word MIMO transmission, a cyclic redundancy check (CRC) is added to a single information block and then coding, for example, using turbo codes and low-density parity check (LDPC) code, and modulation, for example, by quadrature phase-shift keying (QPSK) modulation scheme, are performed. The coded and modulated symbols are then demultiplexed for transmission over multiple antennas.

Figure 4:
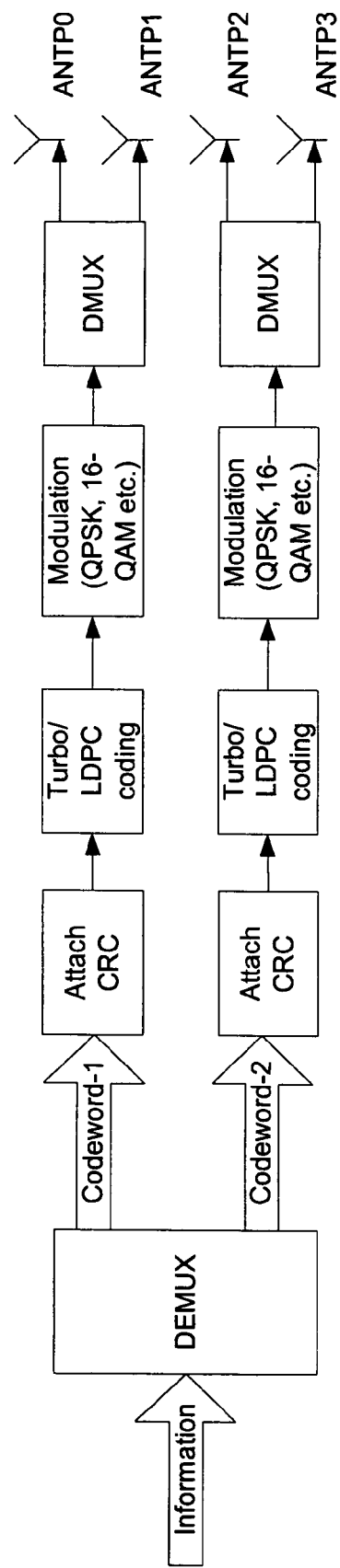
FIG. 4 schematically illustrates a multiple codeword MIMO transmission scheme.

In case of multiple codeword MIMO transmission, shown in FIG. 4, the information block is de-multiplexed into smaller information blocks. Individual CRCs are attached to these smaller information blocks and then separate coding and modulation is performed on these smaller blocks. After modulation, these smaller blocks are respectively demultiplexed into even smaller blocks and then transmitted through corresponding antennas. It should be noted that in case of multi-code word MIMO transmissions, different modulation and coding can be used on each of the individual streams, and thus resulting in a so-called Per Antenna Rate Control (PARC) scheme. Also, multi-code word MIMO transmission allows for more efficient post-decoding interference cancellation because a CRC check can be performed on each of the code words before the code word is cancelled from the overall signal. In this way, only correctly received code words are cancelled, and thus avoiding any interference propagation in the cancellation process.

Figure 5:
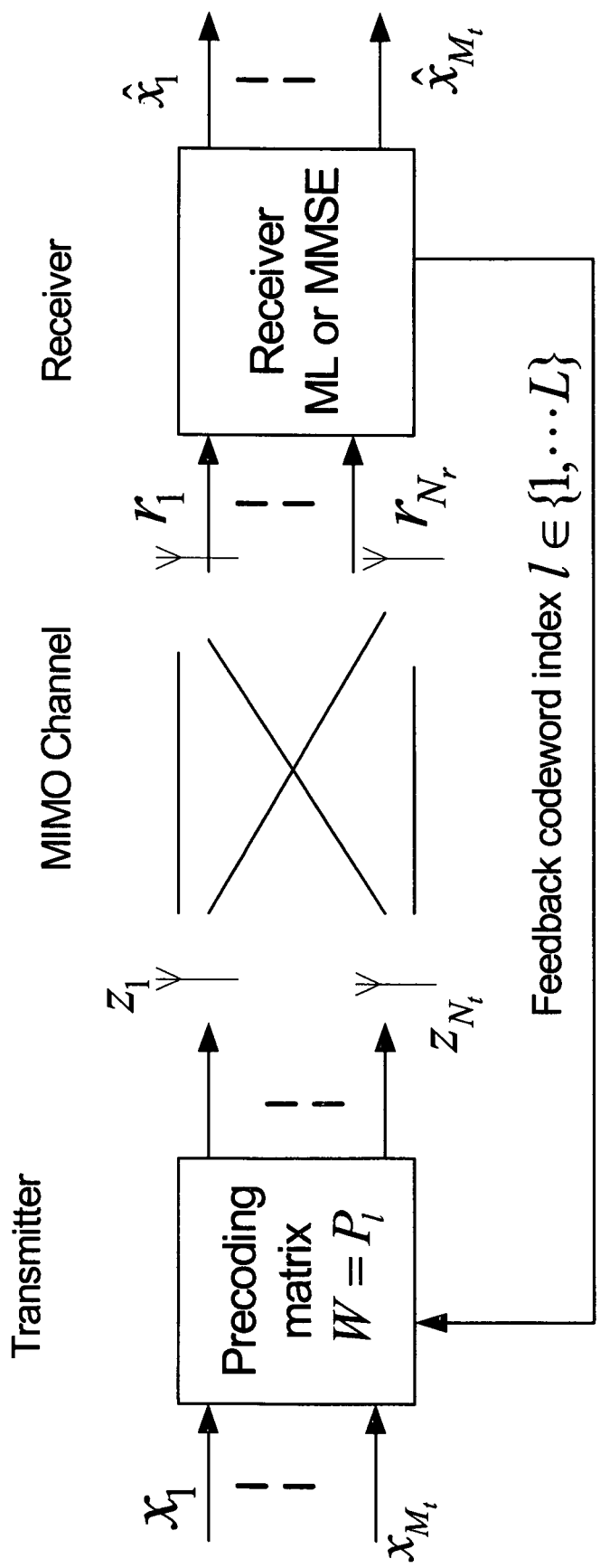
FIG. 5 schematically illustrates a feedback-based MIMO preceding and decoding system.

In a closed-loop MIMO preceding system, for each transmission antenna size we construct a set of precoding matrices (i.e., codewords) and let this set be known at both the Node-B (i.e., the base station) and the user equipment (UE). We call this set of matrices as the "codebook" and denote it $P=\{P_1, \ldots, P_L\}$. Here $L=2^q$ denotes the size of the codebook and q is the number of (feedback) bits needed to index the codebook. In a limited feedback precoding MIMO system illustrated in FIG. 5, once the codebook is specified for a MIMO system, the receiver observes a channel realization, selects the best preceding matrix (i.e., codeword) to be used at the moment, and feeds back the index of the codeword to the transmitter.

An example of precoding is DFT-based or Fourier precoding. A Fourier matrix is a N×N square matrix with entries given by:

$$P_{mn} = e^{j2\pi mn/N} \quad (2)$$

For example, a 2×2 Fourier matrix can be expressed as:

$$P_2 = \begin{bmatrix} 1 & 1 \\ 1 & e^{j\pi} \end{bmatrix} = \begin{bmatrix} 1 & 1 \\ 1 & -1 \end{bmatrix} \quad (3)$$

Similarly, a 4×4 Fourier matrix can be expressed as:

$$P_4 = \begin{bmatrix} 1 & 1 & 1 & 1 \\ 1 & e^{j\pi/2} & e^{j\pi} & e^{j3\pi/2} \\ 1 & e^{j\pi} & e^{j2\pi} & e^{j3\pi} \\ 1 & e^{j3\pi/2} & e^{j3\pi} & e^{j9\pi/2} \end{bmatrix} = \begin{bmatrix} 1 & 1 & 1 & 1 \\ 1 & j & -1 & -j \\ 1 & -1 & 1 & -1 \\ 1 & -j & -1 & j \end{bmatrix} \quad (4)$$

Other forms of precoding include matrices obtained using Householder (HH) equation. An N×N Householder matrix is defined as follows:

$$W = I_N - 2uu^H, \|u\|=1, \quad (5)$$

where $I_N$ is an N×N identity matrix, u is a unit vector. The Householder matrix represents a reflection on the unit vector u in an N-dimensional complex space, which is a unitary operation. The u is also referred to as the generating vector. Assuming a generating vector $u_0^T=[1\ -1\ -1\ -1]$, the 4×4 Householder matrix is given as below:

$$W_0 = I_4 - 2u_0 u_0^H / \|u_0\|^2 = \frac{1}{2}\begin{bmatrix} 1 & 1 & 1 & 1 \\ 1 & 1 & -1 & -1 \\ 1 & -1 & 1 & -1 \\ 1 & -1 & -1 & 1 \end{bmatrix} \quad (6)$$

More generally, $$W_n = I_4 - 2u_n u_n^H / \|u_n\|^2 \quad (7)$$

An example of Householder (HH) four transmission (4-Tx) antennas MIMO preceding codebook used in the 3GPP LTE system is given in Table 1 below.

TABLE 1

Codebook for transmission on antenna ports {0, 1, 2, 3}.

| Codebook index | $u_n$ | Number of layers υ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{123\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

The four antenna ports codebook given in Table 1 uses a total of sixteen (16) generating vectors $\{u_0, u_1, \ldots u_{15}\}$. These sixteen generating vectors result in sixteen 4×4 Householder matrices $\{W_0, W_1, \ldots, W_{15}\}$, which form the precoders for rank4 transmissions. The precoders for lower ranks are obtained by column subset selection from the rank4 precoders. The rank1 precoders always consist of the first column of the matrix. This codebook also exhibits a nested property, that is, lower rank precoders are a subset of the higher rank precoder for the same generating vector. For example for the first rank 4 precoder $w_0^{\{1234\}}/2$ consisting of $W_0$, the rank 1, 2 and 3 precoders $w_0^{\{1\}}, w_0^{\{14\}}/\sqrt{2}, w_0^{\{124\}}/\sqrt{3}$ consists of column 1, columns (1,4) and columns (1,2,4) of $W_0$ respectively.

Figure 6:
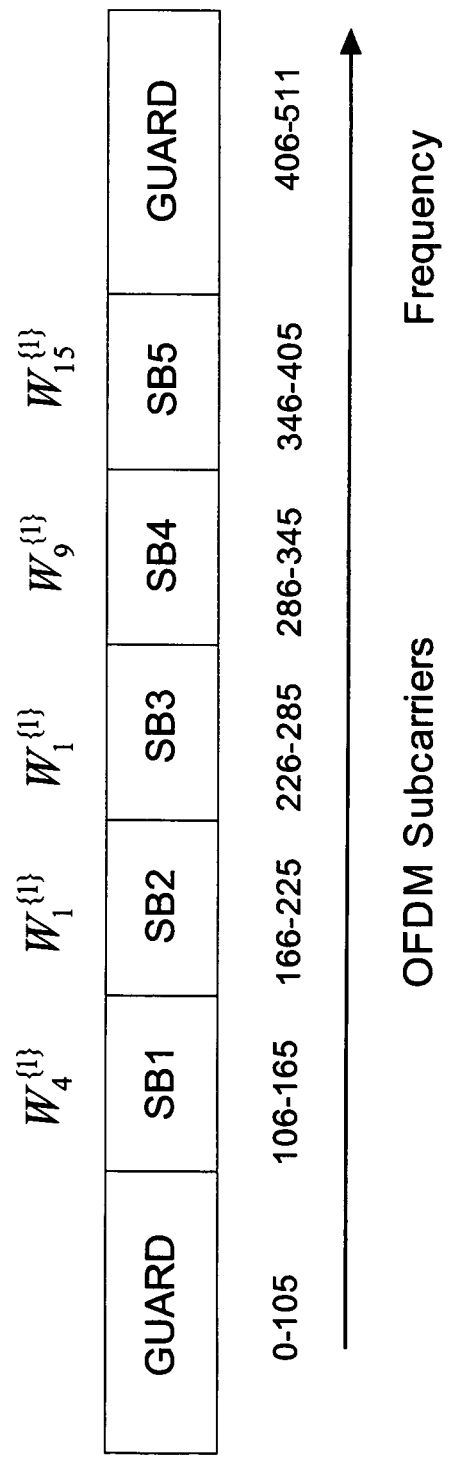
FIG. 6 schematically illustrates an example of MIMO preceding on different subbands.

The precoding used for MIMO transmission needs to be feedback by the User Equipment (UE) to the base station, i.e., Node-B. The preceding feedback information consists of precoding-matrix or column identity. Moreover, due to frequency-selective fading in an OFDM system, the optimal preceding over different subbands can be different as shown in FIG. 6. Therefore, the preceding information can be sent on a subband basis. In the example of FIG. 6, the three hundred used subcarriers are divided into five subbands of sixty subcarriers each. We assume rank-1 transmission over all the subbands. The precoders used for rank-1 transmission in SB1, 2, 3, 4 and 5 are $W_4^{\{1\}}, W_1^{\{1\}}, W_1^{\{1\}}, W_9^{\{1\}}$ and $W_{15}^{\{1\}}$, respectively.

Figure 7:
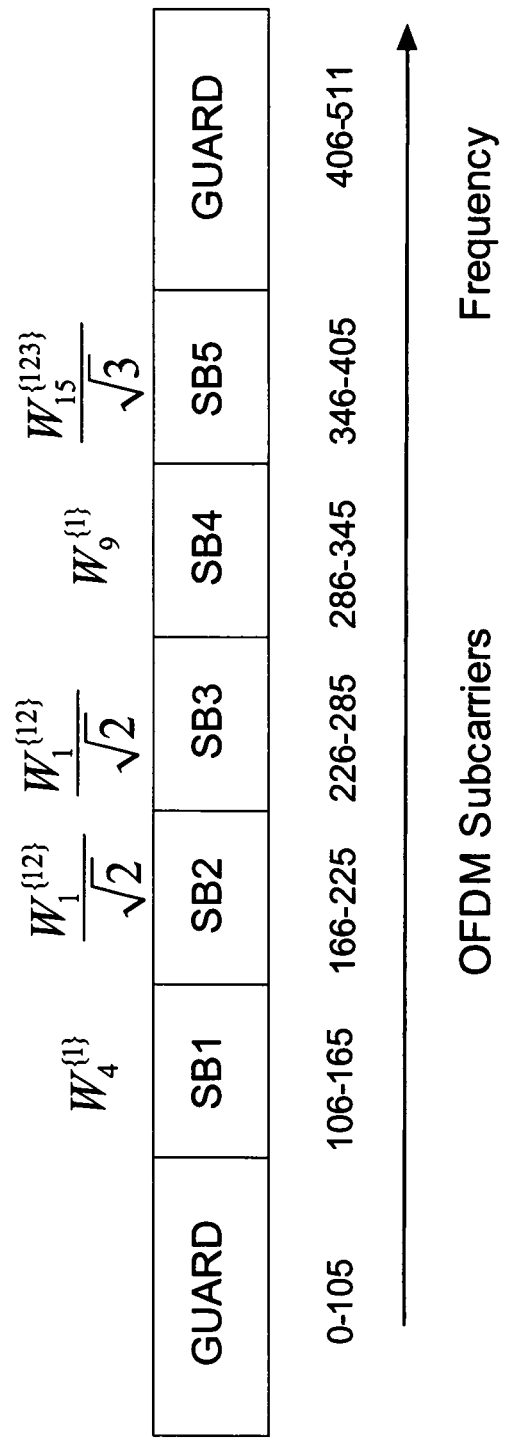
FIG. 7 schematically illustrates an example of MIMO rank on different subbands.

It is well known that even when a system can support 4×4 MIMO, rank-4 (4 MIMO layers) transmissions are not always desirable. The MIMO channel experienced by the UE generally limits the maximum rank that can be used for transmission. In general for weak users in the system, a lower rank transmission is preferred over a high rank transmission from throughput perspective. Moreover due to frequency-selective fading optimal rank may be different on different subbands. Therefore, for optimal performance, UE need to feedback the rank information on a subband basis as shown in FIG. 7. In the example of FIG. 7., the transmissions on SB1, 2, 3, 4 and 5 use rank 1, 2, 2, 1 and 3 respectively.

The precoding matrix indication (PMI) and rank feedback on a subband basis can result in significant feedback overhead. For example, assuming 4-bits per subband for feeding back PMI and 2-bits per-subband for feeding back rank, then the total overhead for feedback on 5 subbands is 30 bits. For larger system bandwidths, the system needs to support a larger number of subbands resulting in even larger feedback overhead. Also, for finer granularity of PMI/rank feedback in frequency, the overhead also increases. Therefore, there is a need to improve the PMI and rank feedback mechanisms that reduces the overhead.

In a first embodiment according to the principles of the present invention, a subset of the total precoding codebooks are selected and fed back to the transmitter at a given time. For example, the codebook of Table 1 can be divided into four subsets as shown in FIG. 8. For feedback at a given time, the UE can select either of subset 1, subset 2, subset 3 or subset 4. Each subset includes four codebook entries, and each codebook entry includes four precoders, with each precoder corresponding to a transmission rank. The PMI feedback is then provided as an codebook entry index within the selected subset.

Figure 9:
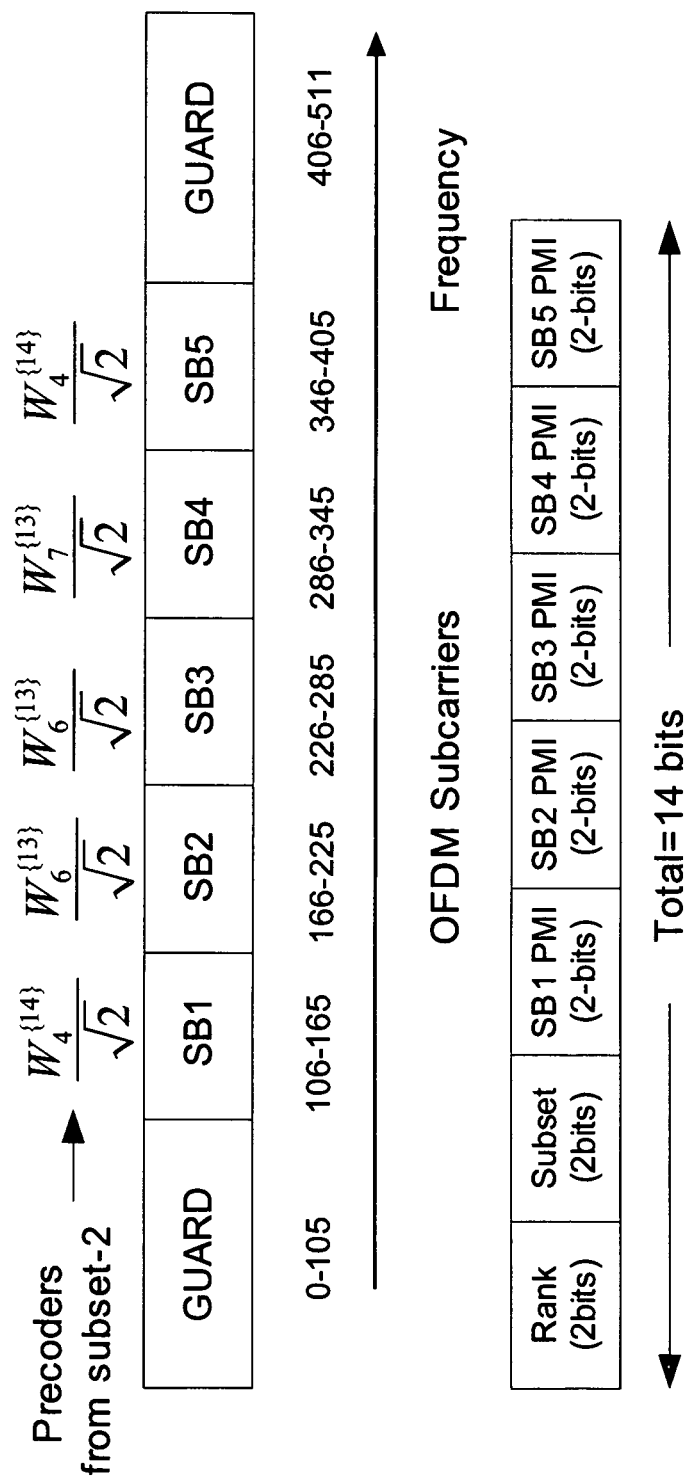
FIG. 9 schematically illustrates a MIMO PMI and rank feedback as an embodiment according to the principles of the present invention.

An example of MIMO PMI feedback assuming feedback using codebook subset 2 is shown in FIG. 9. The subset 2 consists of four codebook entries having indices 4-7. Also, in this example, we assumed that the UE selects rank-2 transmission over all the subbands. As the transmission rank in a 4×4 MIMO system can be either 1, 2, 3 or 4, we use 2-bits for rank indication feedback. Also, 2-bits are used to indicate one of the selected codebook subsets from a total of four subsets. As the codebook subset consists of four codebook entries, 2-bits are used for PMI indication per subband. For the case of five subbands considered in this example, the scheme results in a total of 14-bits overhead.

In a second embodiment according to the principles of the present invention, the subsets have overlapping elements. As shown in FIG. 10, the codebook is divided into four subsets, and each subset has eight codebook entries (elements). For example, subset 1 has codebook entries having indices 0-7, and subset 2 has codebook entries having indices 4-11. Subset 1 and subset 2 have overlapping codebook entries 4-7.

Figure 11:
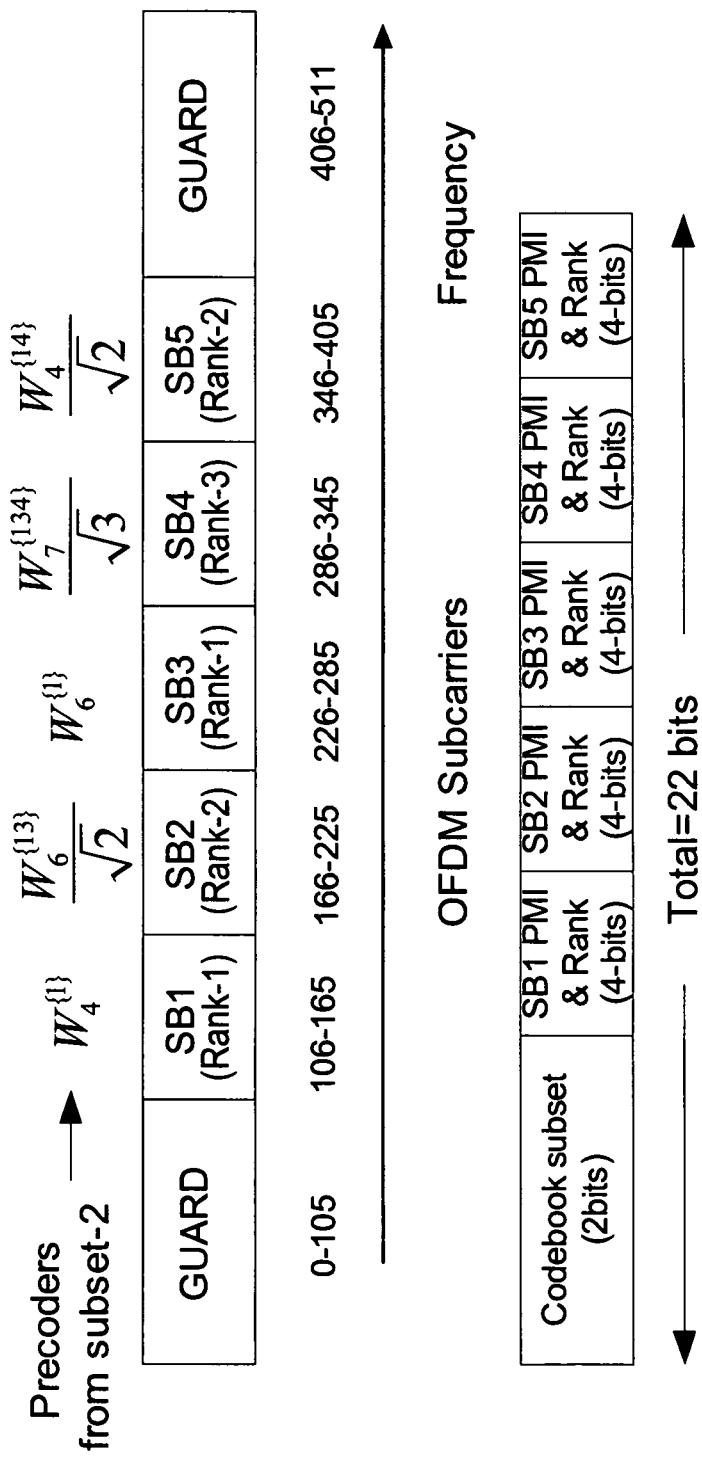
FIG. 11 schematically illustrates a MIMO PMI and rank feedback as another embodiment according to the principles of the present invention.

In a third embodiment according to the principles of the present invention as shown in FIG. 11, the MIMO rank can be different in different subbands. For the case of four codebook subsets, this requires 4-bits feedback overhead per subband for PMI and rank indication. Also, 2-bits are used to indicate the codebook subset selection. This results in a total overhead of 22-bits for the case of five subbands.

In a fourth embodiment according to the principles of the present invention, the codebook of Table 1 is divided into eight subsets as shown in FIG. 12. Each subset includes two codebook entries. For feedback at a given time, the UE can select one subset. The PMI feedback is then provided as the codebook entry index within the selected subset.

Figure 13:
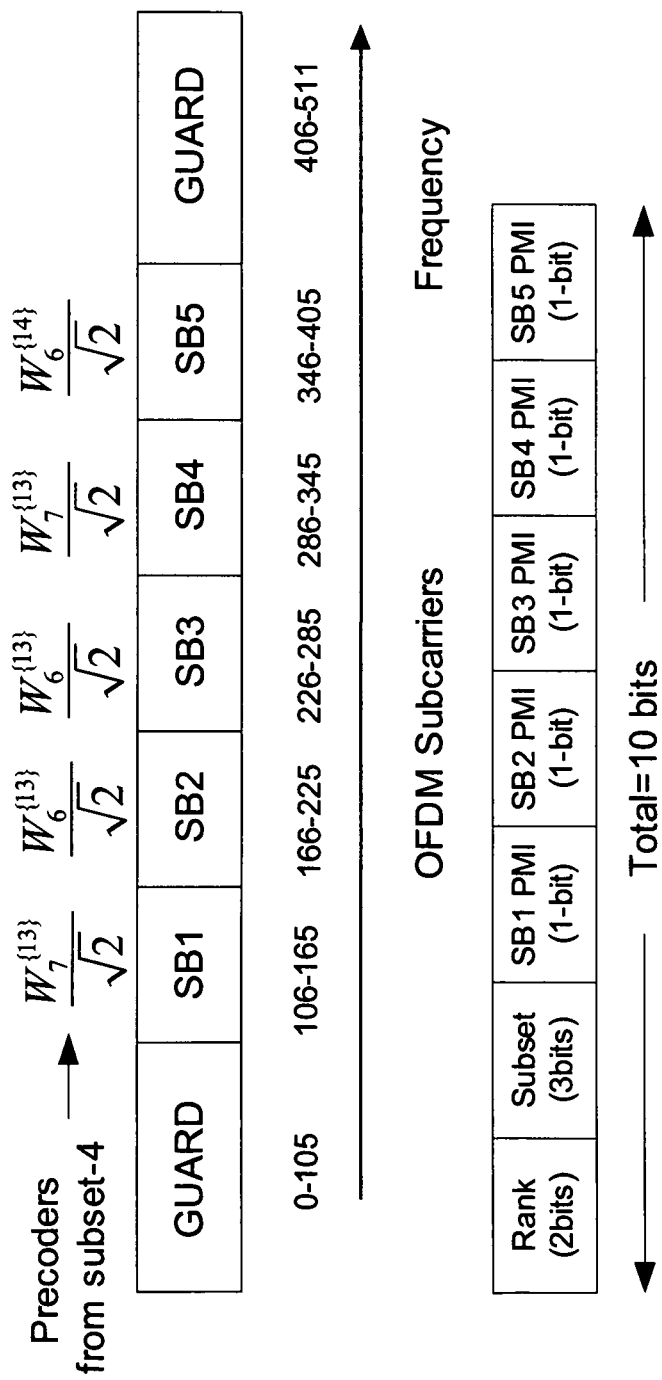
FIG. 13 schematically illustrates a MIMO PMI and rank feedback as still another embodiment according to the principles of the present invention.

An example of MIMO PMI feedback assuming feedback using codebook subset 4 from a total of eight subsets is shown in FIG. 13. The subset 4 consists of codebook indices 6-7. Also, in this example, we assume that the UE selects rank-2 transmission over all the subbands. As the rank in a 4×4 MIMO system can be either 1, 2, 3 or 3, we use 2-bits for rank indication feedback. Also, 3-bits are used to indicate one of the selected codebook subsets from a total of 8 subsets. As each codebook subset has two codebook entries (i.e., precoders) for a fixed rank, 1-bit are used for PMI indication per subband. For the case of five subbands considered in this example, the scheme results in a total of 10-bits overhead.

Figure 14:
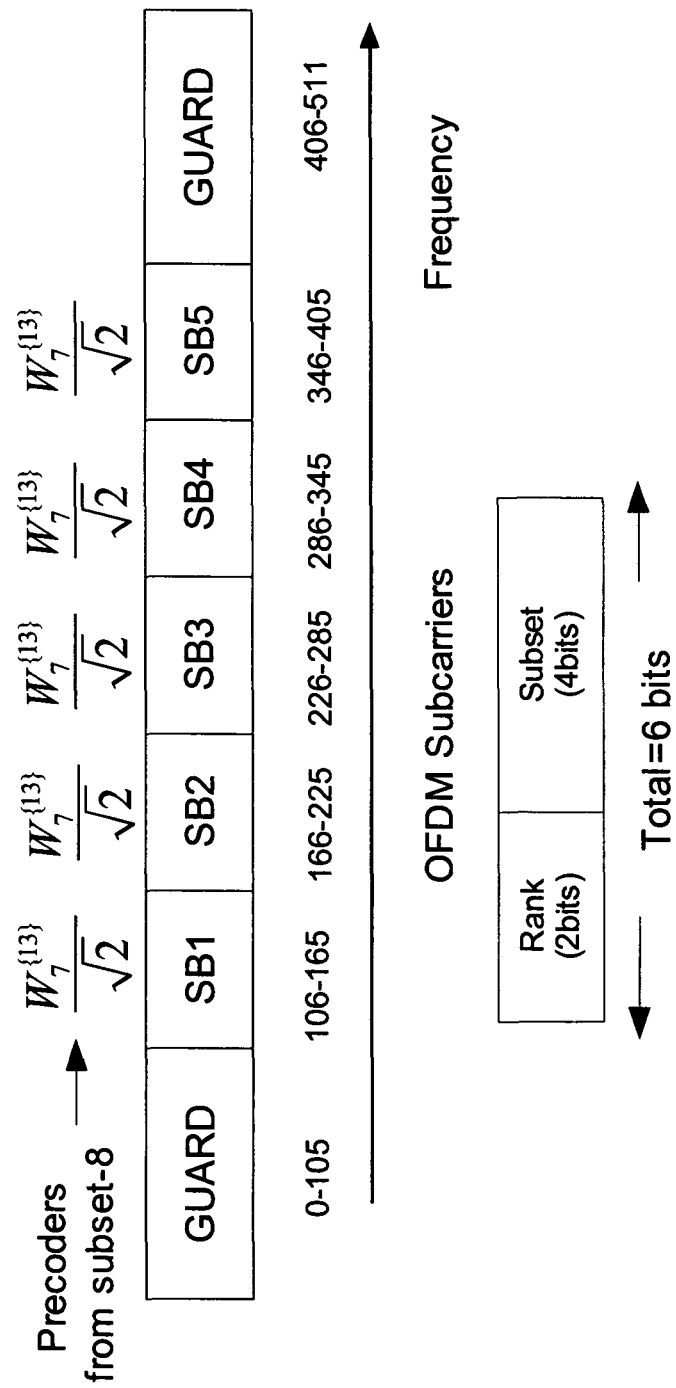
FIG. 14 schematically illustrates a MIMO PMI and rank feedback as still another embodiment according to the principles of the present invention.

In a fifth embodiment according to the principles of the present invention as shown in FIG. 14, the codebook subset consists of a single codebook entry. This results in a total of 16-subsets. In this case, 2-bits are used for rank indication and 4-bits for codebook subset indication resulting in a total of 6-bits overhead. This is assuming that a single rank is selected for all the subbands. Note that since the subset size is just one index, there is no additional information needed to be fed back on a per subband basis. In the example of FIG. 14, a transmission rank of 2 and codebook subset 8 consisting of a codebook entry from the codebook with index 7 is selected for feedback.

Figure 15:
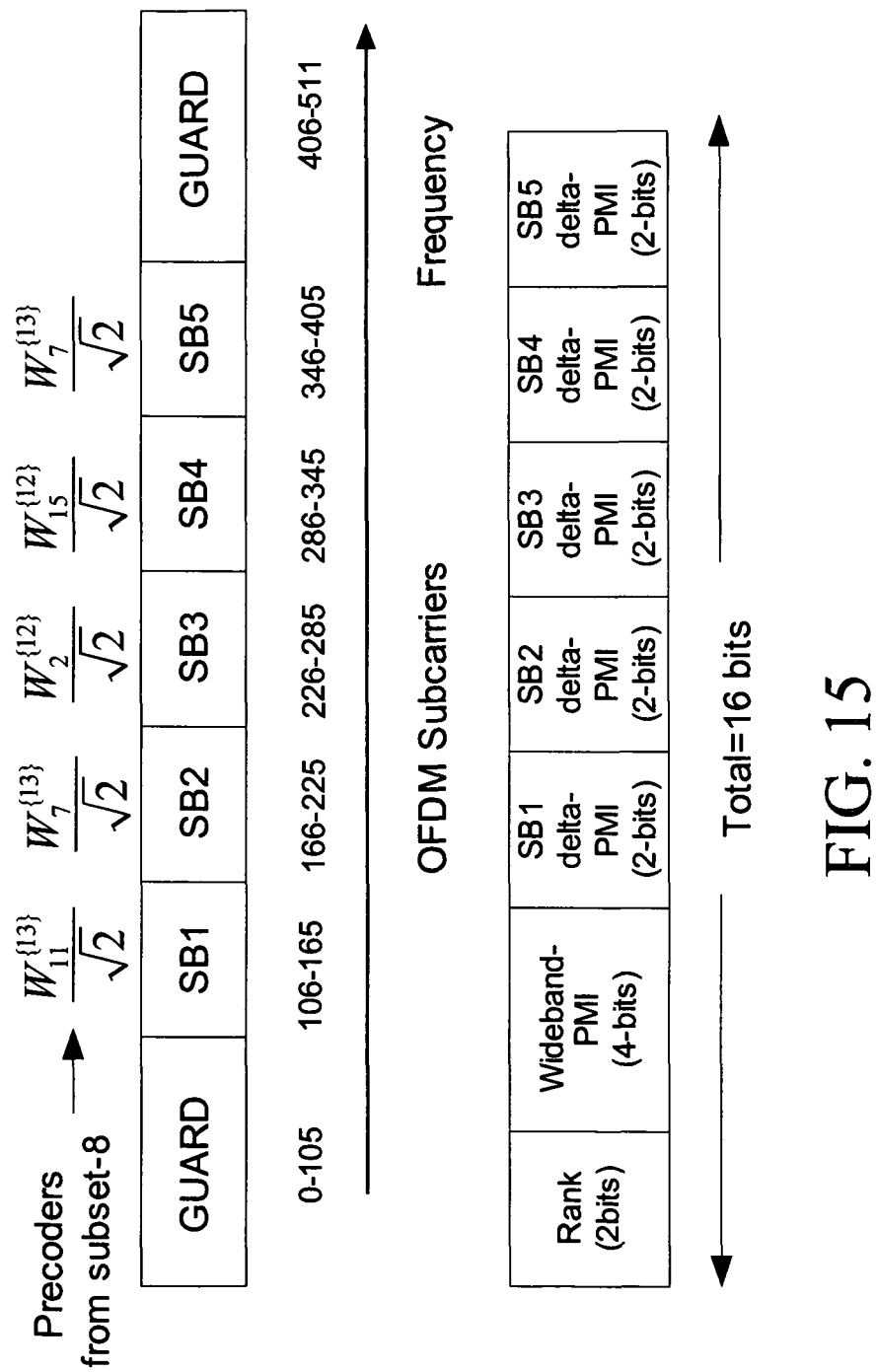
FIG. 15 schematically illustrates a MIMO PMI and rank feedback assuming a wideband-PMI plus delta-PMI on a subband basis as an embodiment according to the principles of the present invention.
Figure 16:
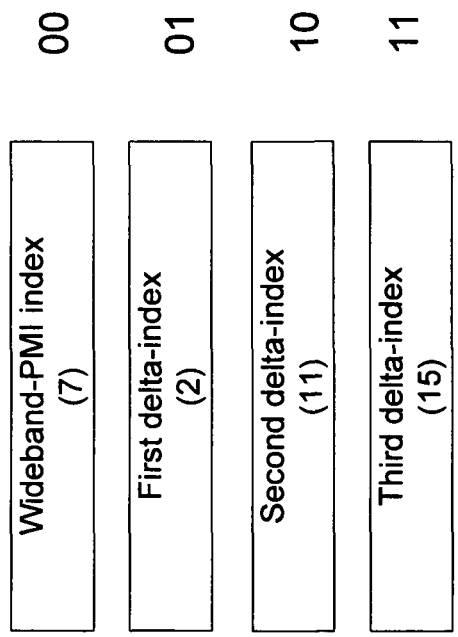
FIG. 16 schematically illustrates a wideband-PMI and delta-PMI set as an embodiment according to the principles of the present invention.

In a six embodiment according to the principles of the present invention as shown in FIG. 15, a wideband-PMI that is valid or good for all of the subbands plus a delta-PMI on a subband basis is provided as feedback to the transmitter. The wideband-PMI indicates the codebook entry index within the entire codebook. For each codebook entry, a set of codebook entries are defined. The relative delta-PMI indicates the PMI, i.e., the index of the codebook entry, relative to the defined set. An example of Wideband-PMI and relative delta-PMI set is shown in FIG. 16. In this case, for a codebook entry having a wideband-PMI index of 7, three delta-PMI codebook entries having codebook indices of 2, 11 and 15 are defined. This represents a set of four codebook entries including the wideband-PMI codebook entry having an index of 7 and the three codebook entries having indices of 2, 11 and 15, respectively. Then, 2-bits are required for indicating delta-PMI per subband. As shown in FIG. 16, four combinations can indicate one of the four elements in the set to represent delta-PMI per subband. In the example of in FIG. 15, SB1, 2, 3, 4 and 5 use index 11, 7, 2, 15 and 7, respectively. We require 2-bits for rank indication, 4-bits for wideband-PMI and 2-bits for delta-PMI per subband. This results in a total feedback overhead of 16-bits.

Figure 17:
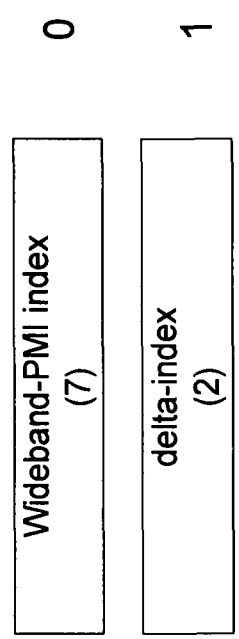
FIG. 17 schematically illustrates a wideband-PMI and delta-PMI set as another embodiment according to the principles of the present invention.
Figures 18, 19:
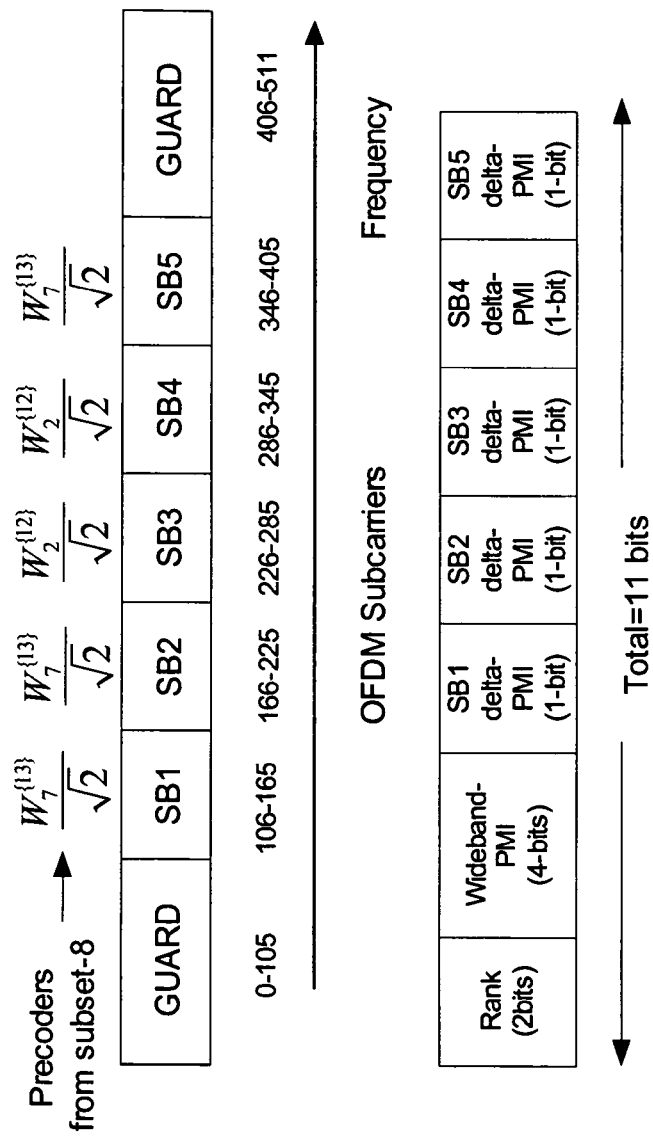
FIG. 18 schematically illustrates a MIMO PMI and rank feedback assuming a wideband-PMI plus delta-PMI on a subband basis as another embodiment according to the principles of the present invention.
FIG. 19 schematically illustrates a bitmap of a subset of a codebook as still another embodiment according to the principles of the present invention.

In a seventh embodiment according to the principles of the present invention as shown in FIG. 18, the wideband-PMI plus delta-PMI index set is of size 2 as shown in FIG. 17. In this case, for a codebook entry having a wideband-PMI index of 7, a subset consisting of a codebook entry having an index of 2 is defined. This represents a total subset size of 2 and 1-bit is required for delta-PMI per subband. In the example of FIG. 18, SB1, 2, 3, 4 and 5 use index 7, 7, 2, 2 and 7 respectively. We require 2-bits for rank indication, 4-bits for wideband-PMI and 1-bit for delta-PMI per subband. This results in a total feedback overhead of 11-bits.

In an eighth embodiment according to the principles of the present invention, the selected subset is indicated by a bitmap. In case of a total of 16 precoders, a bitmap having 16-bits is used as shown in FIG. 19. Starting from the left end of the bitmap, each bit corresponds to a precoder (i.e., a codebook entry). The bits of '1' in the bitmap indicate that the corresponding precoder is part of the subset. In the example of FIG. 19, a subset consisting of precoders with index 2, 6, 10 and 13 is selected. The precoding feedback is then provided by picking precoders from this subset. Note that the bit map approach in this embodiment allows dynamically constructing a subset by picking any precoders for the subset. The bitmap only indicates the subset. And, separate signaling for the selected codebook entry is needed.

Figure 20:
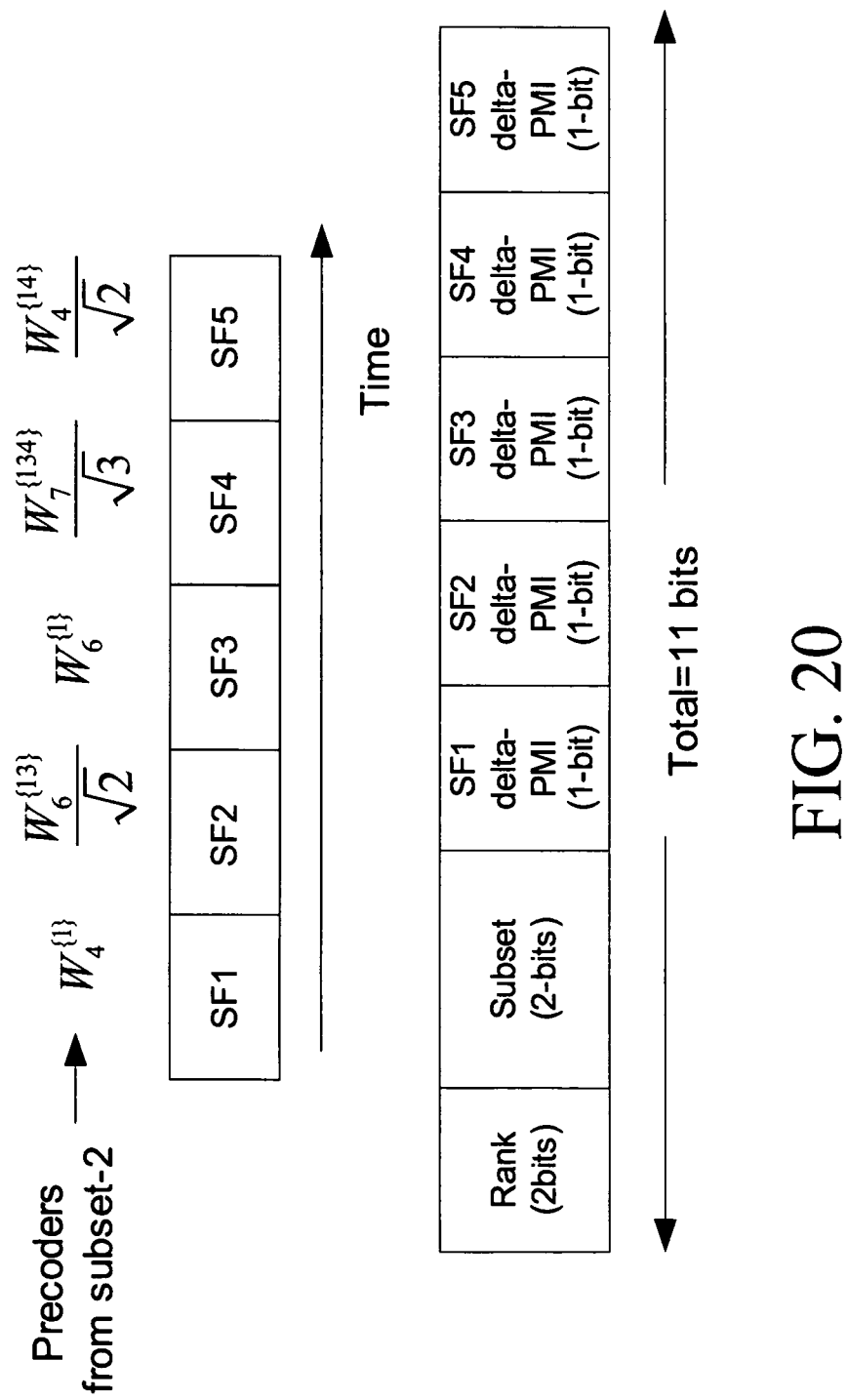
FIG. 20 schematically illustrates a MIMO PMI and rank feedback as still another embodiment according to the principles of the present invention.

The embodiments of the current invention are described by considering precoding feedback in the frequency-domain. The same principles can be applied for efficient precoding feedback in the time-domain as shown in FIG. 20. A subset is selected and delta-PMI feedback is provided for different sub frames. The principles of the current invention can further be extended to the case where delta-PMI is provided both in the frequency and time domain simultaneously. In the example of FIG. 20, the subset is selected from the four subsets in FIG. 8.

In other embodiments of the current invention, the feedback granularity in the time or frequency domain, for example the subband size for PMI feedback is configured by the base station. Also, it is possible to tradeoff feedback granularity and preceding granularity. For example, preceding can be provided for a larger number of subbands with coarse preceding granularity (smaller subset size). In another example, preceding can be provided for a fewer subbands with finer preceding granularity (larger subset size).

While the forgoing explanation of the principles of the present invention have been shown and described in detail in connection with the preferred embodiments, it will be apparent to those skilled in the art that modifications and variations can be made without departing from the spirit and scope of the invention as defined by the appended claims.

What is claimed is:

1. A method for communication, the method comprising:
   constructing a codebook comprising a plurality of codebook entries;
   defining a plurality of subsets of codebook entries from the codebook, with each subset comprising a plurality of codebook entries, each codebook entry comprising a plurality of precoding matrices for respective corresponding transmission ranks;
   selecting a subset for precoding data in dependence upon a channel condition;
   selecting a codebook entry from the subset for precoding data; and
   transmitting, via at least one antenna, a subset index corresponding to the selected subset, and a codebook entry index corresponding to the selected codebook entry within the selected subset.

2. The method of claim 1, wherein at least two subsets having no overlapping codebook entries.

3. The method of claim 1, wherein at least two subsets having at least one overlapping codebook entry.

4. The method of claim 1, further comprising:
   dividing a transmission resource block into a plurality of time units in time domain and a plurality of frequency units in frequency domain;
   selecting the codebook entry and transmitting the codebook entry index for each frequency unit in the transmission resource block.

5. The method of claim 4, further comprising:
   selecting one transmission rank for the entire transmission resource block; and
   transmitting a transmission rank index corresponding to the selected transmission rank.

6. The method of claim 4, further comprising:
   selecting one transmission rank for each frequency unit in the transmission resource block; and
   transmitting the transmission rank index corresponding to the selected transmission rank for each frequency unit.

7. The method of claim 1, further comprising:
   selecting one transmission rank for a transmission resource block; and
   transmitting a transmission rank index corresponding to the selected transmission rank.

8. The method of claim 1, further comprising:
   dividing a transmission resource block into a plurality of time units in time domain and a plurality of frequency units in frequency domain;
   selecting one transmission rank for each frequency unit in a transmission resource block; and
   transmitting the transmission rank index corresponding to the selected transmission rank for each frequency unit.

9. The method of claim 1, further comprising:
   defining four subsets of codebook entries, with each subset comprising four codebook entries; and
   transmitting two bits for indicating the subset index, and two bits for indicating the codebook entry index within the subset.

10. The method of claim 1, further comprising:
    defining eight subsets of codebook entries, with each subset comprising two codebook entries; and
    transmitting three bits for indicating the subset index, and one bit for indicating the codebook entry index within the subset.

11. The method of claim 1, further comprising:
    dividing a transmission resource block into a plurality of time units in time domain and a plurality of frequency units in frequency domain;
    selecting the codebook entry and transmitting the codebook entry index for each time unit in the transmission resource block.

12. The method of claim 11, further comprising selecting the codebook entry and transmitting the codebook entry index for each frequency unit within each time unit in the transmission resource block.

13. The method of claim 11, further comprising:
    selecting one transmission rank for each time unit in the transmission resource block; and
    transmitting the transmission rank index corresponding to the selected transmission rank for each time unit.

14. The method of claim 11, further comprising selecting the transmission rank and transmitting the transmission rank index for each frequency unit within each time unit in the transmission resource block.

15. A method for communication, the method comprising:
    constructing a codebook comprising a plurality of codebook entries;
    defining a plurality of subsets from the codebook, with each subset comprising a single codebook entry comprising a fixed precoding matrix with a corresponding transmission rank;
    dividing a transmission resource block into a plurality of time units in a time domain and a plurality of frequency units in a frequency domain;
    selecting a subset index indicating one of the plurality of subsets for precoding data for each frequency unit in the transmission resource block, the subset index directly coupled to a channel condition; and
    transmitting, via at least one antenna, the subset index corresponding to the selected subset for each frequency unit in the transmission resource block, wherein a single subset index having a single transmission rank is selected for all of the plurality of frequency units in the frequency domain.

16. The method of claim 15, further comprising:
defining sixteen subsets of codebook entries; and
transmitting four bits for indicating the subset index.

17. The method of claim 15, further comprising:
selecting a transmission rank for a transmission resource block; and
transmitting a transmission rank index corresponding to the selected transmission rank.

18. A method for communication, the method comprising:
constructing a codebook comprising a plurality of codebook entries;
defining a plurality of subsets from the codebook, with each subset comprising a single codebook entry comprising a fixed precoding matrix with a corresponding transmission rank;
dividing a transmission resource block into a plurality of time units in time domain and a plurality of frequency units in frequency domain;
selecting a subset index for precoding data, the subset index directly coupled to a channel condition for each frequency unit in the transmission resource block; and
transmitting, via at least one antenna, the subset index corresponding to the selected subset, for each frequency unit in the transmission resource block.

19. The method of claim 18, further comprising:
dividing a transmission resource block into a plurality of time units in time domain and a plurality of frequency units in frequency domain; and
selecting the subset and transmitting the subset index for each time unit in the transmission resource block.

20. The method of claim 19, further comprising selecting the subset and transmitting the subset index for each frequency unit within each time unit in the transmission resource block.

21. A method for communication, the method comprising:
constructing a codebook comprising a plurality of codebook entries;
defining a plurality of subsets of codebook entries from the codebook, with each subset comprising a plurality of codebook entries;
defining a bitmap for each of the subset, with the bitmap comprising bit-"0"s and bit-"1"s, and each bit-"1" indicating a corresponding codebook entry in the subset;
selecting a subset for precoding data in dependence upon a channel condition;
selecting a codebook entry from the subset for precoding data; and
transmitting, via at least one antenna, a bitmap corresponding to the selected subset, and a codebook entry index corresponding to the selected codebook entry within the selected subset.

22. The method of claim 21, further comprising:
dividing a transmission resource block into a plurality of time units in time domain and a plurality of frequency units in frequency domain; and
selecting the codebook entry and transmitting the codebook entry index for each frequency unit in the transmission resource block.

23. The method of claim 21, further comprising:
dividing a transmission resource block into a plurality of time units in time domain and a plurality of frequency units in frequency domain; and
selecting the codebook entry and transmitting the codebook entry index for each time unit in the transmission resource block.

24. The method of claim 23, further comprising selecting the codebook entry and transmitting the codebook entry index for each frequency unit within each time unit in the transmission resource block.

25. A wireless terminal in a communication system, comprising:
a storing unit configured to store a codebook comprising a plurality of codebook entries, with the codebook being configured into a plurality of subsets of codebook entries, each codebook entry comprising a plurality of precoding matrices for respective corresponding transmission ranks; and
a codebook selection unit configured to select a subset, and a codebook entry from the selected subset for precoding data in dependence upon a channel condition, with the wireless terminal transmitting a subset index corresponding to the selected subset, and a codebook entry index corresponding to the selected codebook entry within the selected subset.

26. The wireless terminal of claim 25, wherein at least two subsets having no overlapping codebook entries.

27. The wireless terminal of claim 25, wherein at least two subsets having at least one overlapping codebook entry.

28. The wireless terminal of claim 25, wherein the storing unit further is configured to store a structure of a transmission resource block, which is divided into a plurality of time units in time domain and a plurality of frequency units in frequency domain, with the wireless terminal configured to select the codebook entry and transmit the codebook entry index for each frequency unit in the transmission resource block.

29. The wireless terminal of claim 28, further comprising a transmission rank selection unit configured to select one transmission rank for the entire transmission resource block, with the wireless terminal transmitting a transmission rank index corresponding to the selected transmission rank.

30. The wireless terminal of claim 28, further comprising a transmission rank selection unit configured to select one transmission rank for each frequency unit in the transmission resource block, with the wireless terminal transmitting the transmission rank index corresponding to the selected transmission rank for each frequency unit.

31. The wireless terminal of claim 25, wherein the storing unit is configured to store a structure of a transmission resource block, which is divided into a plurality of time units in time domain and a plurality of frequency units in frequency domain, with the wireless terminal, with the wireless terminal selecting the codebook entry and transmitting the codebook entry index for each time unit in the transmission resource block.

32. The wireless terminal of claim 31, wherein the wireless terminal is configured to select the codebook entry and transmit the codebook entry index for each frequency unit within each time unit in the transmission resource block.

33. A wireless terminal in a communication system, comprising:
a storing unit configured to store a codebook comprising a plurality of codebook entries, with the codebook being divided into a plurality of subsets, and each subset comprising a single codebook entry comprising a fixed precoding matrix with a corresponding transmission rank; and
a codebook selection unit configured to:
divide a transmission resource block into a plurality of time units in a time domain and a plurality of frequency units in a frequency domain; and select a subset for precoding data in dependence upon a channel condition for each frequency unit in the transmission resource block; and a transmitter configured to transmit, via at least one antenna, a subset index corresponding to the selected subset for each frequency unit in the transmission resource block.

34. A wireless terminal in a communication system, comprising:

a storing unit configured to store a codebook comprising a plurality of codebook entries, with the codebook being divided into a plurality of subsets of codebook entries from the codebook, and each subset comprising a plurality of codebook entries, and with the storing unit further configured to store a bitmap for each of the subset, the bitmap comprising bit-"0"s and bit-"1"s, and each bit-"1" indicating a corresponding codebook entry in the subset;

a codebook selection unit configured to select a subset and a codebook entry from the subset for precoding data in dependence upon a channel condition, with the wireless terminal configured to transmit a bitmap corresponding to the selected subset, and a codebook entry index corresponding to the selected codebook entry within the selected subset.

35. A method for communication, the method comprising:

constructing a codebook comprising a plurality of codebook entries;

defining a plurality of subsets of codebook entries from the codebook, with each subset comprising a plurality of codebook entries;

defining a mapping scheme between the plurality of codebook entries and the plurality of subsets of codebook entries;

selecting a wideband codebook entry for a frequency wideband from the plurality of codebook entries in the codebook;

selecting, from the subset of codebook entries corresponding to the wideband codebook entry according to the mapping scheme, a subband codebook entry for each of a plurality of subbands within the wideband;

defining a plurality of delta codebook entry indices for the plurality of subband codebook entries as indices of the subband codebook entries relative to the subset corresponding to the wideband codebook entry;

transmitting, via at least one antenna, a wideband codebook entry index corresponding to the selected wideband codebook entry; and transmitting, via the at least one antenna, a delta codebook entry index on a subband basis.

36. A base station for a communication system, comprising:

a processing circuitry configured to:
construct a codebook comprising a plurality of codebook entries;

define a plurality of subsets of codebook entries from the codebook, with each subset comprising a plurality of codebook entries, each codebook entry comprising a plurality of precoding matrices for respective corresponding transmission ranks;

select a subset for precoding data in dependence upon a channel condition;

select a codebook entry from the subset for precoding data; and transmit, via at least one antenna, a subset index corresponding to the selected subset, and a codebook entry index corresponding to the selected codebook entry within the selected subset.

* * * * *